United States Patent [19]
Fitzpatrick

[11] 3,944,796
[45] Mar. 16, 1976

[54] SYSTEM AND METHOD OF RECORDING EVENT INFORMATION FOR SUBSEQUENT ANALYSIS

[76] Inventor: Lawrence J. Fitzpatrick, 601 University Ave. SE., Minneapolis, Minn. 55414

[22] Filed: Feb. 7, 1975

[21] Appl. No.: 547,815

[52] U.S. Cl. .................................. 235/151; 360/4
[51] Int. Cl.² .................... G06F 15/20; G11B 5/00
[58] Field of Search ............... 235/151, 61.12 M; 340/172.5; 360/4, 79, 41, 42, 40, 44; 346/74 M

[56] References Cited
UNITED STATES PATENTS

| | | | |
|---|---|---|---|
| 3,281,806 | 10/1966 | Lawrance et al. ................ | 360/44 |
| 3,681,776 | 8/1972 | Gloess ................................ | 360/4 |
| 3,715,727 | 2/1973 | Yu ...................................... | 340/172.5 |
| 3,737,863 | 6/1973 | Rowland et al. .................. | 340/172.5 |
| 3,832,733 | 8/1974 | Eldridge ............................ | 360/4 |

*Primary Examiner*—Joseph F. Ruggiero
*Attorney, Agent, or Firm*—Stuart R. Peterson

[57] ABSTRACT

A conventional stereo tape recorder is used to record a series of reference pulses on each of the two channels or magnetic tape tracks followed in each instance by intermediate event pulses representative of behaviorial phenomena or units. The delay or time interval between reference pulses and event pulses is indicative of the particular behavior that has been observed. An astable or free running multivibrator for each channel provides the reference pulses, whereas a monostable or one-shot multivibrator, which is triggered by its companion astable multivibrator, provides the event pulses. A key-controlled resistance-capacitance circuit connected in the monostable circuitry functions to vary the delay or position of the event pulses with respect to the reference pulses. Individual keys, or combination of keys, are assigned codes representative of the various behaviors and subjects to be observed and recorded.

The recorder at some later time is interfaced with an appropriately programmed computer, the computer then processing the tape signals on a time basis provided by the computer clock and converting such signals to binary values representative of the various time delays or time positions of the intermediate event pulses with respect to the reference pulses. The computer can perform various logical functions, such as ratioing, averaging and sorting, and then store the results in its memory for appropriate analysis, such as determining behavior patterns of the subjects that have been previously observed.

20 Claims, 5 Drawing Figures

SYSTEM AND METHOD OF RECORDING EVENT INFORMATION FOR SUBSEQUENT ANALYSIS

BACKGROUND OF THE INVENTION

1. Field of the Invention

This invention relates generally to a system and method of recording event information, and pertains more particularly to a system and method for recording behavior data on magnetic tape as it is being observed for subsequent analysis via an appropriately programmed computer.

2. Description of the Prior Art

As far as both human and animal behavior studies are concerned, two problems have persisted throughout the years. One concerns the capture of the pertinent data and the second involves the analysis thereof. In response to increasing pressures to study behavioral phenomena, both that relating to meaningful human problems and also that pertaining to animal conduct, various attempts have been made in an effort to upgrade the analytical tools that are utilized in the conducting of human and animal behavioral studies. Data has in the past frequently been recorded on mimeographed forms and later transferred to electronic data processing media for analysis. The difficulty stemming from the use of mimeographed forms is that an observer is limited in his ability to record any appreciable amount of behavioral information. It is rarely that electronic data processing equipment is immediately at hand when conducting behavioral studies. In some cases, the laboratory or even the free field area, such as a playground or home, can be set up in the immediate vicinity of the electronic processing equipment. However, frequently the subjects being examined do not act naturally in what amounts to an artificialy contrived environment which differs from their usual and familiar surroundings. Hence, a very real need has persisted for a long time with respect to recording as much behavioral data as is needed at the time the observer is noting it in the normal enviroment in which the subject is behaving in a more natural and uninhibited manner.

SUMMARY OF THE INVENTION

One object of the invention is to provide a simple system and method for recording information pertaining to observed events. More particularly, an aim of the invention is to use a conventional tape recorder in the recording procedure.

Another object is to provide a system and method of recording event information that can be used as an input device to a general purpose high-speed electronic computer, thereby allowing relatively large masses of observed data accumulated over a relatively long period of time to be quickly analyzed when the need for doing so arises. In this regard, an aim of the invention is to provide a means for initially recording data at one or more vantage points remote from the computer, and then feeding the recorded signals to the computer at some convenient time, such as when low priority computer time is available. It will be recognized that my invention will possess especial utility in the conducting of human and animal behavior studies where the observation area may be at some distance from the computer. In other words, an exceedingly versatile off-line system is made available for the study of various behavioral phenomena.

Another object of the invention is to provide a system and method of recording observed data in which the initial recording of the event information is performed with equipment that is portable and compact. More specifically, both the recorder and my device for providing time-coded pulse signals to the recorder are very small and readily carried from place to place.

A further object of the invention is to provide a system and method in which the speed at which the tape travels is not critical, as long as the tape moves at a substantially constant speed, thereby permitting the tape to be "played" to the computer from a different recorder from that initially used at the observation site. For instance, the observed data can be recorded on a casette-type recorder, and the casette or casettes shipped, if need be, to an electronic data processing center which is miles away.

Still another important object is to provide a system and method of the foregoing character that obviates the need for paper and pencil recording of observed behavior which can be distracting to the observer, even in some instances causing some events which should be noted to not be recorded.

Yet another object of the invention is to provide for the simultaneous recording of information pertaining to a variety of events and/or subjects. In this regard, the keys can be actuated individually or in combination to record plural events or acts. More specifically, it is planned that one group of five keys be actuated with one of the observer's hands and a second set of five keys with the other hand, and that the coded results from one group of keys be recorded on one tape track and the results from the other key group on the other track.

Still further, an additional object is to record data relating to events in which the frequency and duration of each event is of importance. Thus, not only is it possible when practicing my invention to make of record various events as they occur, but it is of especial benefit, particularly when conducting experiments involving children, and also animals, to make of record the length of time it takes the subject (or subjects) to perform a given act and also the number of times such act is repeated during the observation interval.

Briefly, my invention involves the depressing or actuation of one or more keys representative of a particular event or events to be recorded. An astable or free-running multivibrator or oscillator produces a series or sequence of reference pulses. Each time that a reference pulse is generated, a monostable or one-shot multivibrator or oscillator is triggered into action so that an intermediate or event pulse is produced at a certain time after the reference pulse. If no keys are actuated, then the intermediate or event pulses occur at a different point in time after each reference pulse than when the keys are operated. Thus, the relation or position of each intermediate or reference pulse after its particular preceding reference pulse is indicative of the key or keys that have been actuated and hence indicative of the particular event that has been observed because the actuation of individual keys or combinations thereof have been selected so as to denote the various events which are to be recorded. The recorder is preferably a stereo tape recorder which permits two observers to record data simultaneously, one set of data being on one magnetic track or channel and the other set of data being recorded on the other magnetic track or channel. Two devices are used in the dual recording process, each having therein an astable multivibrator and a monostable multivibrator. At some convenient later time, the data captured on the magnetic tape is simply played into an appropriate programmed computer so that it is internally processed and stored for subsequent analysis. A great mass of data can be processed and can be retrieved in accordance with a prearranged programming schedule which will enable the analyst to obtain only that information for which he has an immediate need or interest. It is important to appreciate that the recording of the event data can be made at one location and the processing thereof at a location at some distance from the observing site. Not only that but the information can be transferred from the magnetic tape into the computer at a much later time, the gap between observing and initially recording the information on tape and the subsequent processing thereof by way of computer being completely immaterial.

BRIEF DESCRIIPTION OF THE DRAWINGS

Figure 4:
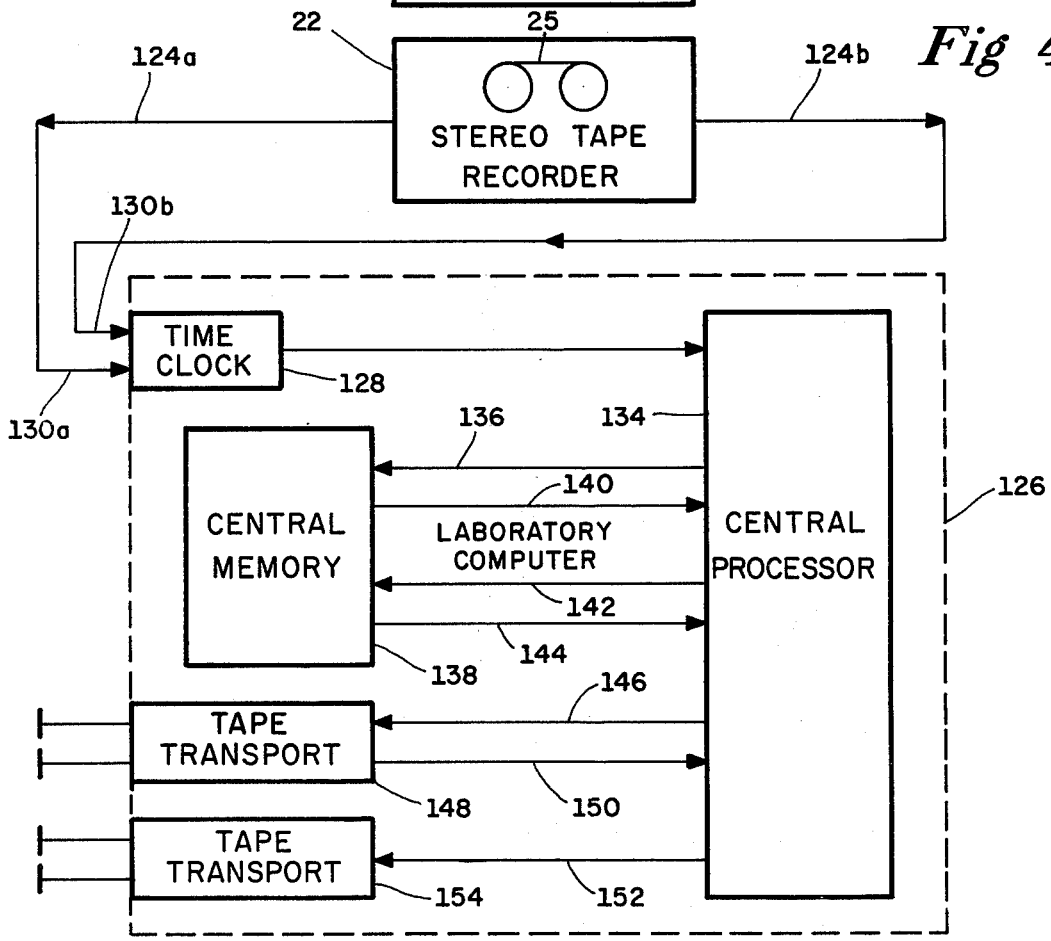
Figure 5:
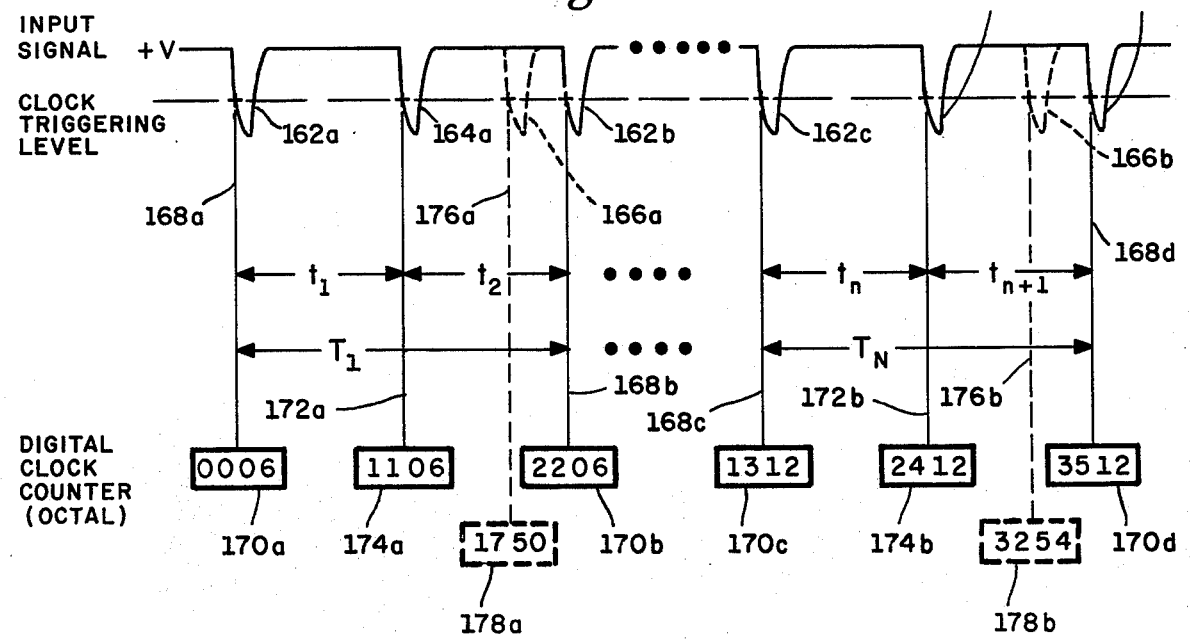

FIG. 4 is a block diagram of the stereo tape recorder playing its recorded data into a laboratory computer, and FIG. 5 depicts typical wave forms representative of the pulse signals recorded on one channel or track of the magnetic tape handled by the stereo tape recorder and which recorded pulse signals are delivered to the time clock of the computer illustrated in FIG. 4, octal values having been assigned to clock triggering points on the pulse signals.

DESCRIPTION OF THE PREFERRED EMBODIMENT

Figure 1:
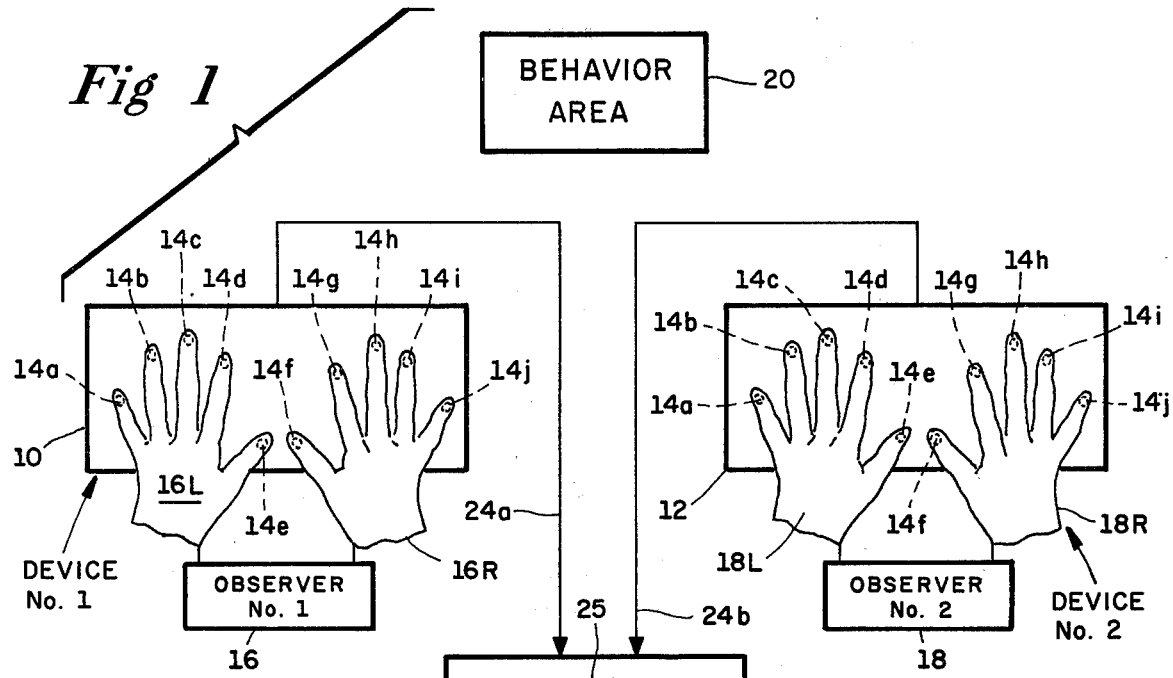
FIG. 1 is a block diagram depicting the recording of behavioral data at an observation area, the view involving two key-controlled devices being operated by two observers and the simultaneous recording of the observed data on a stereo tape recorder.

Referring first to FIG. 1, two identical key-controlled devices 10 and 12 have been shown in block outline; these devices, respectively, are also designated as device No. 1 and device No. 2. Although the so-called keys are best viewed in FIG. 2, nonetheless the ten such keys utilized with each device 10, 12 have been labeled 14a–14j, there being one beneath each finger of a pair of hands 16L and 16R for the device 10, the hands 16L, 16R belonging to a human observer 16. By the same token, a pair of hands 18L, 18R have been superimposed over the keys 14a–14j of the device 12, the hands 18L, 18R in this instance belonging to a second observer 18. It might be explained at this point that in actual practice keys are used to actuate the switches presently to be referred to, but for drafting simplicity pushbuttons have been illustrated, there being one for each finger. Although the manner in which the information observed in the area 20 is recorded by the actuation of the keys 14 will not be fully understood until a more detailed description has been given, it can be explained at this stage that the keys have been individually and in combination assigned various codes representative of the particular acts or behavior to be recorded. Hence, the information that is fed into the devices 10, 12 by reason of the keys 14 is delivered in the form of pulses to a stereo tape recorder 22 having a pair of inputs 24a, 24b which deliver the signals from the two devices 10, 12 onto a magnetic tape 25 via preamplifiers, there being one for each channel, the amplifiers and recording heads (none of which are pictured but which are conventional).

Figure 2:
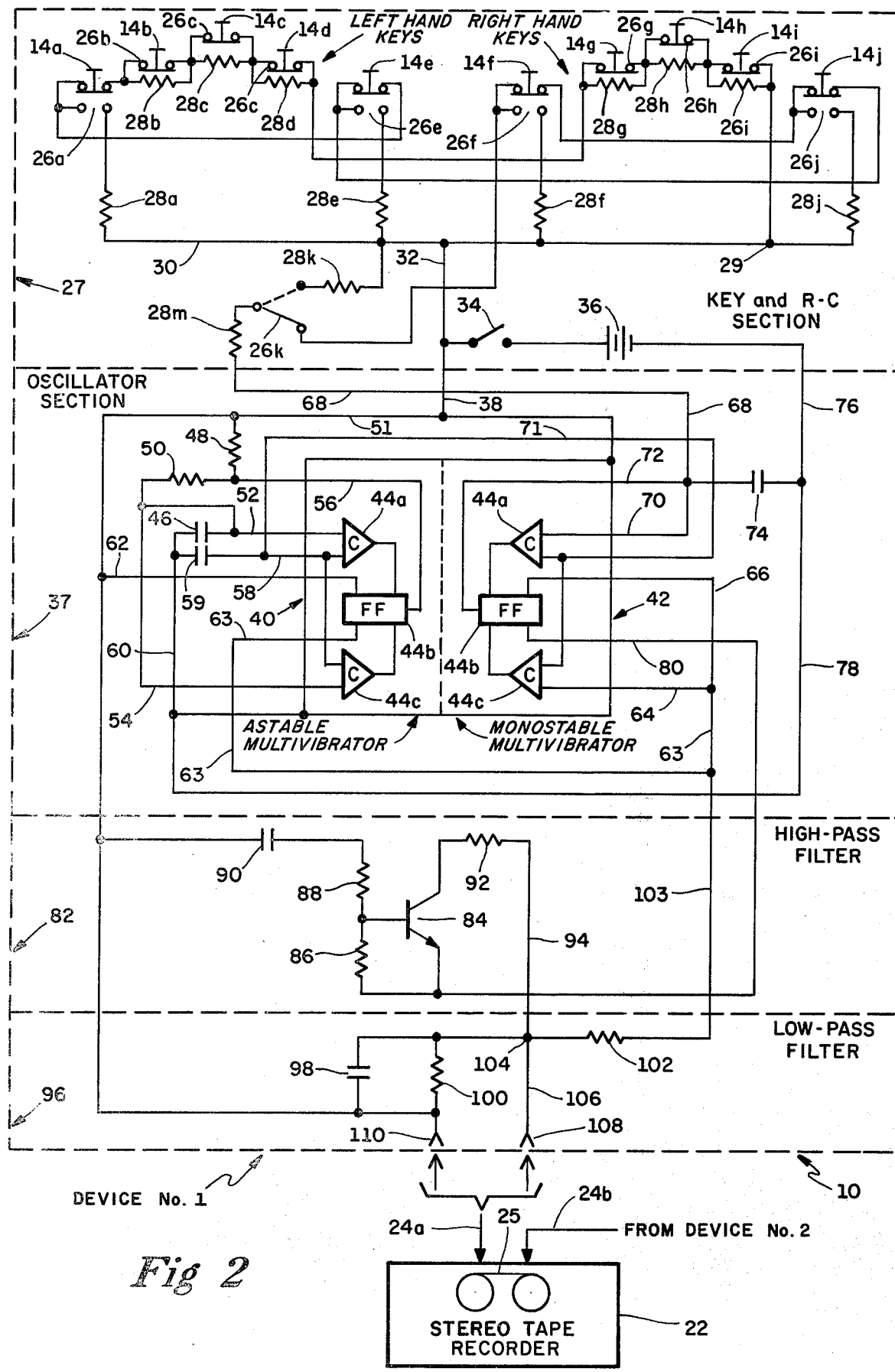
FIG. 2 is a schematic diagram of one of the keycontrolled devices of FIG. 1 together with the stereo tape recorder illustrated in block form.

As already indicated, the various keys 14a–14j for the device 10 are best viewed in FIG. 2 and are contained in what will be called a key and R-C section 27. It will be recalled that in actual practice the pushbuttons 14a–14j are in the form of manually actuated keys. Individually operated by the various keys or pushbuttons 14a–14j are switches 26a–26j, there being one pushbutton or key 14 for each switch 26. It perhaps should be explained at this point that the switches 26 may be of the microswitch variety. All of the switches 26a–26j have been shown as normally closed. In order to illustrate the versatility and flexibility of my invention, however, certain of the alluded to switches 26 are what might be termed "general code" switches and others "special code" switches. Falling into the "general code" category are the switches 26b, 26c, 26d, 26g, 26h and 26i. The switches 26a, 26e, 26f and 26j fall into the special code category along with still another switch labeled 26k. However, the number of switches in each category can be varied. While the switch 26k can be considered to be a finger-actuated switch, it does not underlie the fingers of the hands 16L and 16R so it has been shown differently.

At this time attention is called to the presence of various resistors 28a–28j for the switches 26a–26j and the resistor 28k for the switch 26k. In addition, still another resistor 28m is employed to retain some resistance in the circuit when no pushbuttons 14 are actuated. It is believed obvious without presenting a detailed description that the actuation of the various switches 26 will provide different resistive paths. For instance, if the pushbutton 14b is depressed, then the resistor 28b is no longer by-passed and the inclusion thereof in the circuit increases the resistance value. However, the pushbuttons can be used to actuate switches that would decrease the resistance, as only a resistive change is needed. It will later become apparent that the various resistors 28 act to vary the resistance-capacitance time constant of the circuitry.

It will be perceived that a conductor 30 is connected to the various resistors 28a, 28e, 28f, 28j and also 28k. Even the resistors 28b, 28c, 28d, 28g, 28h and 28i are connected to the conductor 30 also, but only at one point which has been labeled 29; should the pushbuttons 14b, 14c, 14d, 14g, 14h and 14i all be depressed, then all of the resistors 28b, 28c, 28d, 28g, 28h and 28i would be serially introduced into the circuit and it should be obvious that the amount of resistance will be considerably increased over that provided by only the resistor 28b which is introduced when just the pushbutton 14b is actuated. If only the pushbutton 14a is depressed, then the resistor 28a is added. Once again, it is believed evident that the amount of resistance can be varied considerably by the proper selection of the various pushbuttons 14 and that the switch 26k when individually actuated will still further influence the overall circuit resistance, in this instance actually overriding or superceding all of the other resistors. Connected to the conductor 30 is a conductor 32 that leads to an on-off switch 34 which must be closed in order to energize the conductor 30 from the positive side of a power source shown in the form of a battery 36. Not only does the switch 34 energize the key-controlled R-C section 27 of the device 10, but it also energizes an oscillator section 37 through the agency of a conductor 38.

Contained in the oscillator section 37 are two oscillators 40, 42, the oscillator 40 actually being an astable or free-running multivibrator and the oscillator 42 a monostable or one-shot multivibrator. My invention lends itself readily to using linear integrated circuits and the multivibrators or oscillators 40, 42 can be of the type more fully described in a brochure on timers published in 1973 by Signetics Corporation, the particular type there described being designated as a 556 dual timer. It is fully explained in the timer brochure, and even an equivalent circuit presented, as to how one side of the dual timer can be connected via the provided pins to provide an astable operation, whereas the other side connected to provide a monostable operation. Each multivibrator 40, 42 includes a first comparator 44a, a flip flop 44b and a second comparator 44c. While a sufficient description will herein be given that should enable those skilled in the oscillator art to understand the functioning of the multivibrators or oscillators 40, 42, additional information certainly can be obtained from the Signetics Corporation, particularly from the brochure that has just been referred to.

Inasmuch as the function of the multivibrator 40 is to provide a sequence of reference pulses, it is intended that the multivibrator 40 be provided with external circuitry so as to trigger itself and thereby be truly a free-running device. Accordingly, an external capacitor 46 charges through a pair of resistors 48, 50, doing so via a conductor 51 that connects with the previously mentioned conductor 38. The duty cycle may be precisely set by the ratio of the resistors 48, 50. More specifically, it will be obseved that there is a threshold line 52 leading from one side of the capacitor 46 to one input of the comparator 44a. A conductor 54 from threshold line 52 leads to the trigger input of the comparator 44c. A discharge line 56 extends from the junction of the resistors 48, 50 to the flip flop 44b for the multivibrator 50. Somewhat similarly, a line 58 supplies a control voltage to the other input of the comparator 44a, doing so via a capacitor 59 which in turn is connected to a conductor 60 which connects with the previously mentioned capacitor 46 and also to a line 61 connecting with the ground terminal of the multivibrator 40. A line 62 extends to the rest terminal of the flip flop 44b, doing so from the conductor 51.

The output from the multivibrator 40 is delivered through the agency of a line or conductor 63 that extends over to a trigger line 64 belonging to the monostable multivibrator or oscillator 42. It wil be seen that the trigger line 64 connects with one input of the comparator 44c for the multivibrator 42. The line 63 also leads to the reset line 66 for the flip flop 44b, it being intended that the monostable multivibrator 42 reset itself after being triggered by an appropriate output or reference pulse signal from the astable multivibrator 40, which pulse signal will be mentioned soon. A conductor 68 leads from the switch 26k of the key-controlled R-C section 27 down to a line 70 connected to the threshold input of the comparator 44a. The other output for the comparator 44a has a conductor 71 leading from the previously mentioned control voltage line 58 to it, thereby applying the same control voltage to both comparators 44a. The conductor 68 also connects with a discharge line 72 that is in turn connected with the flip flop 44b of the multivibrator 42.

While the values of the resistors 28, which value can be collectively varied, plays a very important role in the practicing of my invention, a capacitor 74 is also incorporated into the circuitry for the purpose of providing a variable time delay between the reference pulses produced by the multivibrator 40 and the intermediate or event pulses, as they will be termed, provided by the multivibrator 42. Whereas one side of the capacitor 74 is connected to the conductors 70 and 72, the other side thereof is connected to the negative side of the power supply 36 through the agency of a conductor 76. Still another conductor 78 connects the conductor 76 and also the same side of the capacitor 74 to the ground line 61 that has already been mentioned in conjunction with the multivibrator 40. Of importance at this time is to mention the presence of a conductor 80 that connects with the output of the flip flop 44b belonging to the multivibrator 42.

It should perhaps be explained at this point that the astable multivibrator 40 produces a sequence of reference pulses which are, in the present instance, negative going. These negative going pulses are delivered to the monostable multivibrator 42 via the line 63. The negative going pulses are used to trigger the monostable multivibrator 42. Actually, the triggering action is initiated as the leading edge of each pulse reaches a predetermined negative magnitude or value. However, the monostable multivibrator 42 is held in its stable condition throughout the duration of the reference or negative pulse. As the reference pulse is decaying, the holding action that has been occurring is removed so that the resetting can actually begin at a point on the trailing edge of this pulse, such resetting resulting in the monostable multivibrator 42 going to its semistable state which is positive and its R-C controlled timing cycle or interval starts. Thus, the semi-stable positive state persists for a period of time determined by the amount of resistance that has been introduced by way of the keys 14, the capacitance remaining constant. It is as the monostable multivibrator 42 returns to its stable state that a pulse signal is derived which serves as the event pulse. This will be better understood, it is believed, when considering the waveforms portrayed in FIG. 5.

Turning now to a description of the high-pass filter labeled 82, it will be seen that an NPN transistor 84 is included in this filter. One end of a resistor 86 is connected to the output line 80 and its other end is connected to the base of the transistor 84 and also to one end of a resistor 88 which is in turn connected to a capacitor 90 located between it and the conductor 51 that is connected to the positive side of the power source 36. The emitter of the transistor 84 is also connected to the output line 80 and a resistor 92 is connected to the collector of the transistor 84 and also to a conductor 94.

From the foregoing, it should be recognized that when the monostable multivibrator 42 is in its stable state, the capacitor 90 will be charged. More specifically, its right side will be more negative that its left side. Owing to the fact that the base and the emitter of the transistor 84 are at the same negative potential, it follows that the transistor will, under these conitions, be turned off or rendered non-conductive. However, when the monostable multivibrator 42 changes to its semistable state, then the line 80 carries a positive signal, resulting in a discharging of the capacitor 90. As the monostable multivibrator 42 changes back from its unstable state to its stable state, then the capacitor 90 begins to charge. The charging action causes a flow of current through the resistor 86 with a concomitant voltage drop thereacross which results in the base of the transistor 84 being momentarily more positive than the emitter of the transistor. With the transistor 84 momentarily rendered conductive, a flow of current occurs through the collector resistor 92, thereby causing the conductor 94 to become more negative. This results in the production of a negative or event pulse which is used as explained below.

The conductor 94 extends downwardly to a low-pass filter denoted generally by the reference numeral 96. It comprises a capacitor 98, a resistor 100 in parallel therewith which are connected directly to the conductor 94. The output line 63 from the astable multivibrator 40 has already been mentioned when referring to the triggering arrangement for the monostable multivibrator 42. At this time, however, attention is directed to a resistor 102 having one end connected to the output line 63 by a conductor 103. The other end of the resistor 102 is attached to a junction 104, the junction 104 being where the conductor 94, which carries the negative event pulse, connects with the low-pass configuration 96.

It should be appreciated that the junction 104 has impressed thereon not only the output or reference pulses from the astable multivibrator 40 through resistor 102, but also the output or event pulses from the high-pass filter 82 via the conductor 94, the pulses from the filter 82 being derived from the monostable multivibrator 42 as already described.

A conductor 106 extends from the junction 104 downwardly to a separable connector 108. Similarly, the previously mentioned conductor 51 connects with a separable connector 110. The lowpass filter 96 is connected across conductors 51 and 106. The two connectors 108, 110 in turn lead into a two-wire cable that connects with the input 24a of the stereo tape recorder 22. Although the second key-controlled device 12 does not appear in FIG. 2, a legend indicates that the input 24b is connected to the device 12.

Whereas the stereo tape recorder 22 has two inputs 24a and 24b, one for each channel, it also follows that it has two outputs, one for each channel. As with the recording heads, the playback heads of the recorder 22 are conventional and therefore are not shown. The outputs 124a and 124b have been shown in FIG. 4 and connect directly with a laboratory computer 126. Inasmuch as a Digital Equipment Corporation laboratory computer, Model PDP-12, has been used in the processing of the pulse signals recorded on a stereo tape recorder, more specifically that designated by the reference numeral 22, it will be helpful, it is believed, to describe generally the manner in which the PDP-12 computer processes data from the recorder 22.

Therefore, reference should now be made to FIG. 4 where the outputs 124a, 124b of the recorder 22 lead to the computer designated in its entirety by the reference numeral 126. The computer 126 has a real time clock 128 as a part thereof, the time clock having a plurality of inputs, two of which have been identified by the reference numerals 130a and 130b. More specifically, it is these inputs 130a, 130b that are connected with the outputs 124a, 124b, respectively. What the time clock 128 actually does is to read the pulse signals from the magnetic tape 25 contained in the stereo tape recorder 22. Each time a signal pulse is received from the recorder 22, the clock 128 records the running time of the pulse occurrence in digital counts of approximately $2.5 \times 10^{-6}$ seconds and the particular input channel, that is whether from the output 124a or 124b, from which the particular pulses come. When a pulse arrives, the clock 128 sets a flag which the computer 126 interprets to mean that a pulse has been received from the recorder 22. Upon "seeing" the flag set by the clock 128, the central processor identified by the reference numeral 134 reads the running time, storing it temporarily in the central memory 138 and also determining from which input channel the pulse was received from in order to sort the events from the two channels furnished by the recorder 22. It will be appreciated that the pulse repetition rate or frequency of the clock pulses is much greater than that for the reference pulses that have been recorded on the magnetic tape of the recorder 22 and that the clock 128 functions as a digital clock counter.

Next, the computer subtracts the time of the last or preceding pulse on that particular channel from the time of the present or current pulse, storing the difference as an interpulse interval in one of a set of sequential memory locations in the central memory 138 for that input channel. It then stores the negative of the time of the present pulse occurrence for use as the "last pulse occurrence" when the next pulse occurs on that particular channel. It repeats this process for approximately one twenty-fifth of a second or 15 pulses and then begins to analyze this information and simultaneously store additional timing information for an analysis one twenty-fifth second later.

The pulse intervals to be analyzed will alternate in length, the sum of two adjacent intervals equaling the pulse interval or period of the multivibrator 40. It perhaps will be well to refer to FIG. 5 at this particular point. It will be perceived from FIG. 5 that the pulses derived from the astable multivibrator have been assigned the reference numerals 162a, 162b, 162c and 162d. Of course, it must be recognized that many such pulses are received and that drawing limitations permit the showing of only the four pulses 162. However, the threshold acceptance of the pulses from the magnetic tape 25 of the recorder 22 can be made to occur at a definite rise (or fall) of each pulse 162. This is labeled clock triggering level in FIG. 5 and it will be discerned that a vertical line 168a extends downwardly from the triggering level of the pulse 162a to a block labeled 170a which is indicative of the count from the digital clock counter. Quite arbitrarily, the octal value has been given as 0006 in the block 170a. A line 168b extends downwardly from the clock triggering level of the reference pulse 162b, leading to a block 170b containing the value 2206. The designation $T_1$ denotes the pulse interval or period between the reference pulses 162a and 162b. Inasmuch as an indeterminate number of pulses 162 are to be processed, the line 168c extending downwardly from the clock triggering level of the pulse 162c to the block 170c starts the period $T_N$, the period $T_N$ terminating at the vertical line 168d extending downwardly from the triggering point on the pulse 162d, the line 168d leading to a block 170d containing the octal value 3512 therein.

The pulses derived from the monostable multivibrator 42 via the high-pass filter 82 have been represented by the numerals 164a and 164b. For the sake of discussion, it will be assumed that the pulses 164a and 164b are produced when no keys or pushbuttons 14 have been actuated. Thus, the interval $t_1$ represents the minimum amount of delay that would occur between the so-called reference pulses 162 and the so-called event pulses 164. True, at this particular time no keys or pushbuttons 14 have been depressed, but nonetheless the absence of an event that would be observed in the area 20 can also be significant and actually constitutes an event. Since the period $T_1$ is fixed, then it follows that the period $t_2$ is of a predetermined duration, for $t_1 + t_2 = T_1$. The same thing applies to the intervals $t_n$ and $t_n + 1 = T_N$. In other words, for no key actuation during the periods $T_1$ and $T_N$, $T_1$ would equal $t_n$, $T_N$ being some period later in the time than that signified by $T_1$.

It is not believed necessary to identify which keys 14 are depressed to shift or delay the pulses 164 with respect to the reference pulses 162 to provide other significant event pulses. All that need be recognized is that the dotted outline pulses labeled 166a and 166b represent the depressing of one key or more so as to change the R-C constant of the monostable multivibrator 42 provided by the particular value of the resistance incorporated into its circuitry by virtue of the actuation of a given key 14 or group of keys 14, for a combination of keys can represent additional event information according to whatever code is selected.

What should be appreciated is that a ratio of the time between adjacent pulses 162 and 164, or between 162 and 166, contains all of the event information that has been recorded on the magnetic tape by the recorder 22 as is done in FIG. 1. Thus, the computer 126 initially locates the largest of the first two sequential interval values, this being between the lines 168a and 176a in FIG. 5, and begins at this point, summing the large values into numerator sum and the alternate small values, these being representative of the time elapsing between the lines 176a and 168b, to provide alternate small values into a denominator sum. If any large or small value varies from the last preceding large or small value by more than a given constant, the computer 126 assumes that a change has been made as far as the keys 14 are concerned or that an input signal error has arisen so that it does not include that value in the sum. If the difference persists for more than two intervals $T_1$, a key change is assumed and if the difference does not persist, then a data error is assumed to have occurred and the suming is continued. If a key change has been assumed and four or more events have been summed into the numerator and denominator, the computer 126 accepts these values and eliminates the rest of the samples. If less than four values have been summed, a new set of sums is begun. At the end of the one twenty-fifth second sequential sample of pulse intervals for a given channel, the numerator sum is divided by the denominator sum and the ratio result is stored in a second set of sequential locations for that channel from the recorder 22. This procedure is repeated four times and then the best estimate of those samples is selected. This processing has been indicated by the paths 136, 140, 142 and 144.

At this stage, the best estimate of a set of four sample ratios are stored via a path 146 within the computer connecting with a first tape transport 148. This tape transport 148 constitutes a temporary tape file. More specifically, the computer 126 now determines the difference between each pair of members belonging to the set of four values and averages the values whose difference is less than a selected constant. If two averages have been computed, it reports the average containing the first value. Otherwise, it reports the average value, if an average was reported, or the first value if no average was computed. A value is reported for each of the two devices 10, 12 approximately ever one-sixth second. These values for both input channels as denoted by the inputs 130a, 130b, or conversely from the outputs 124a, 124b belonging to the recorder 22, are stored alternatively in what has already been referred to as a temporary file provided by the tape transport 148, this being no computer magnetic tape and the storing occurring throughout the sampling period for subsequent translation into key values as will now be described.

Via the path 150 extending from the transport 148 to the central processor 134, the central processor 134 now determines how long each given pulse ratio has continued to persist on each of the channels by counting the number of similar pulse ratios within a given tolerance range which occurred in a row and then multiplying that count by a time constant. When a pulse ratio outside the tolerance range occurs, a change in the actuation of the keys 14 is recognized and signaled, and the previous pulse ratio duration is computed. In addition, the computer looks up the key combination for that previous set of pulse ratios in a table which equates specific pulse ratios to specific combinations of the keys 14. Finally, the computer stores via the path 152 extending to a tape transport 154 the particular key combinations that have been found for each of the two channels along with the length of time that each key combination continued. Thus, the tape handled by the transport 154 functions as a more permanent tape file, retaining the captured event data in retrievable form until it is no longer needed and is replaced with other data, either derived from additional magnetic tapes having pulse data recorded thereon in the manner described in conjunction with FIG. 1 or releasing the computer 126 for other data processing duties.

Figure 3:
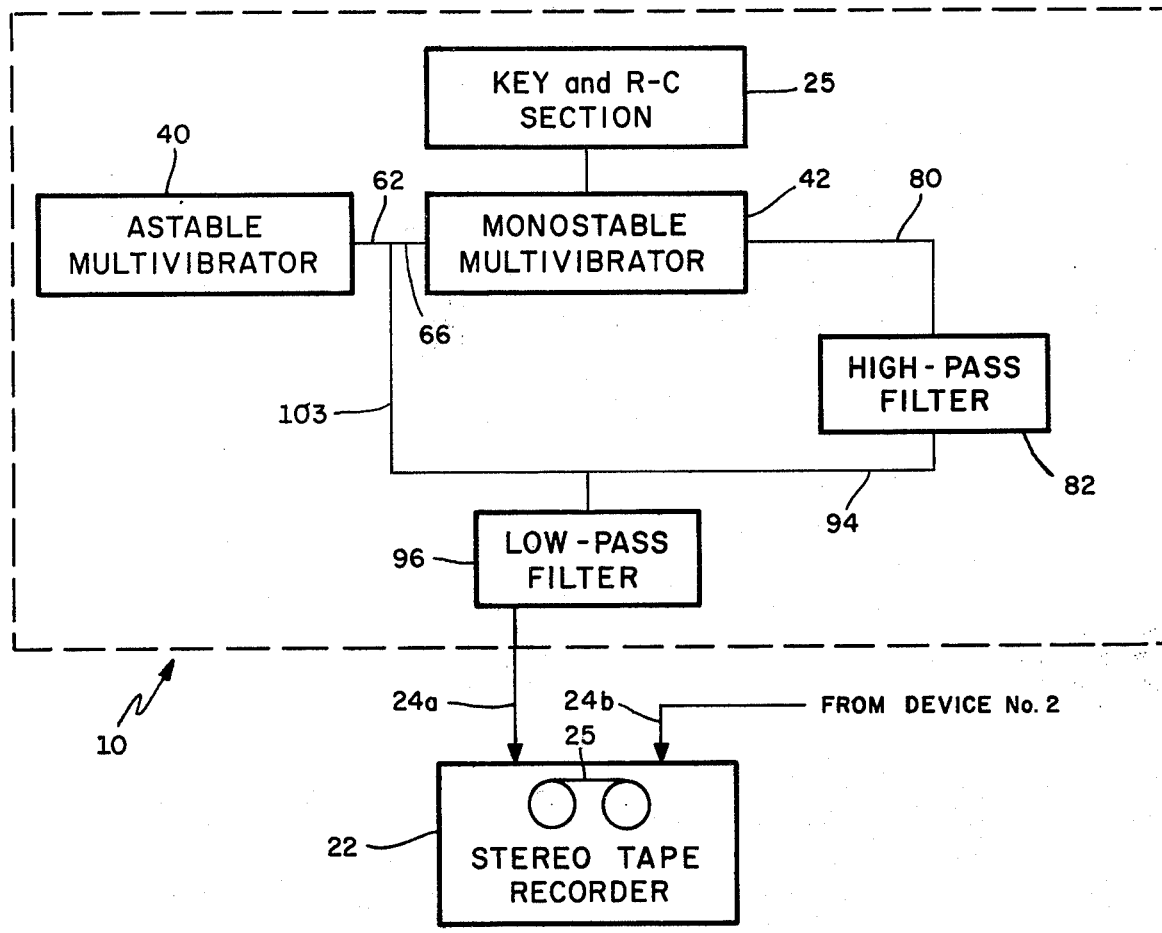
FIG. 3 is a simplified block diagram corresponding to FIG. 2.

Although the manner in which the key-controlled device 10 (and also the device 12) functions should be readily understandable from the description already given, nonetheless a brief summary will be of some benefit, it is thought. In this regard, FIG. 3 has been presented for the purpose of simplifying the overall system as indicated by one of the devices 10. Therefore, referring now to FIG. 3, the astable multivibrator 40 puts out a sequence of reference pulses, which correspond to the pulses 162 in FIG. 5, and these pulses as they are generated by the multivibrator 40 are utilized to trigger the monostable multivibrator 42 into operation, doing so via the line 66. The pulses derived from the monostable multivibrator 42 through the agency of the high-pass filter 82 correspond initially to the pulses 164 shown in FIG. 5. However, whenever any of the keys 14 are actuated, then more resistance is introduced into the circuitry and a greater time delay is produced between the pulses 162 and the pulses 164 to provide what would correspond to the pulses 166 of FIG. 5. Stated somewhat differently, the multivibrator 42 is maintained in its semistable or more positive state for a longer period of time. The position of the pulses 166 have thus been shifted so that there is a longer time interval between the preceding reference pulse 162 and the succeeding reference pulse 162, the position of the event pulse 166 signifying what event has been observed.

The event pulses, although corresponding to the pulses 166, are actually produced by the high-pass filter 82 and are impressed on the low-pass capacitor filter 96 along with the reference pulses from the astable multivibrator 40. Although the envelopes of the reference and event pulses are changed by reason of the filter 96, the timing of the pulses delivered to the recorder 22, more specifically via the input 24a thereof, is not changed as recorded by the stereo tape recorder 22. Since the pulse timing is only relative, one nicety of the invention is that the playback or interface speed need not be identical to the recording speed. Thus, the recorder 22 used in FIG. 1 can be a small portable casette recorder, whereas the one in FIG. 4 can be a larger non-portable type. Obviously, both the recording and playback speeds should be substantially constant even though not necessarily equal.

Consequently, whatever ratio of $t_1$ with respect to $t_2$ prevails, $t_1$ being increased with respect to the preceding pulse 162 (pulse 162a for instance) to provide a pulse 166 and $t_2$ decreased with respect to the succeeding pulse 162 (pulse 162b for instance), denotes very specifically a given event that has been observed by the observer 16 who has used both of his hands 16L and 16R in the changing of the combination of keys 14 so as to accurately position whatever event pulse 164 or 166 between the two adjacent reference pulses 162. It will be obvious and readily understandable that it would be virtually impossible to show any great number of event pulses and that the two events represented by the pulses 164 (actually the lack of any activity in the behavior area 20) and the pulses 166 (actually a behavior that has been observed in the area 20) will record what has occurred, how long the particular act (or with respect to the pulses 164 how long there was no action) plus the number of times the particular act or event has repeated. Once processed by the computer 126 and stored on the tape of the tape transport 154, any particular data indicative of particular acts can be recalled from the transport 154 and outputed for whatever analysis and evaluation is to be made by the captured data.

I claim:

1. In a system for storing information pertaining to events as they are observed, the system comprising a plurality of manually actuatable keys or pushbuttons representative of certain events to be observed, first means providing a sequence of reference pulses having a given repetition rate, second means providing intermediate pulses between at least some of said reference pulses, means controlled by at least one of said keys or pushbuttons for establishing the position of at least some of said intermediate pulses with respect to said reference pulses in accordance with the actuation of a selected key or pushbutton, or selected keys or pushbuttons, in order to denote one or more of said certain events, and means for recording said signals derived from both said reference and intermediate pulses on a recording medium in the same time sequence provided by said first and second means.

2. A system as set forth in claim 1 in which said recording medium is a magnetic tape and the signals derived from said first and second means are electromagnetic pulses.

3. A system as set forth in claim 2 including a computer for receiving and processing said recorded signals in accordance with the relative time elapsing between those recorded signals derived from said reference pulses and those recorded signals derived from said intermediate pulses.

4. A system as set forth in claim 3 in which said computer includes means for producing a sequence of clock pulses having a greater repetition rate than said reference pulses, said computer also including means for processing said recorded signals in accordance with the time relation between said clock pulses and said recorded signals.

5. A system as set forth in claim 4 in which said computer processing means includes a processor and a memory having a plurality of address locations, said control means delivering data processed by said processor to selected locations in said memory, and means for storing said data.

6. A system as set forth in claim 1 in which said first means includes an astable multivibrator or oscillator to provide said reference pulses and said second means includes a monostable multivibrator or oscillator triggered by said astable multivibrator, said key-controlled means including an R-C circuit having a resistive portion for each key or pushbutton to change the timing cycle of said monostable multivibrator or oscillator in accordance with the R-C constant determined by the key or pushbutton, or the keys or pushbuttons that are actuated.

7. A system as set forth in claim 6 including a high-pass filter connected to said monostable mutivibrator or oscillator for producing said intermediate pulses as influenced by the R-C constant determined by the key or pushbutton, or the keys or pushbuttons that are actuated.

8. A system as set forth in claim 7 in which said recording means sequentially records the reference pulses produced by said astable multivibrator or oscillator and the intermediate pulses produced by said high-pass filter.

9. A system as set forth in claim 8 in which said recording means is a tape recorder having a magnetic tape on which electromagnetic pulses derived from said reference and intermediate pulses are recorded in the order of their occurrence.

10. A system as set forth in claim 9 including a computer for converting the pulses from said tape to binary data in accordance with the time relationship of said intermediate pulses with respect to said reference pulses.

11. A system as set forth in claim 1 including a second plurality of keys or pushbuttons, an additional first means for providing a sequence of reference pulses having a given repetition rate, an additional second means for providing intermediate pulses between at least some of the reference pulses provided by said additional second means, and additional means controlled by at least one of said second plurality of keys or pushbuttons for changing the position of at least some of said intermediate pulses from said additional second means with respect to the reference pulses of said additional first means in accordance with the actuating of a selected key or pushbutton of said second plurality of keys or pushbuttons, said recording means constituting a two-channel tape recorder for recording on one channel thereof the pulse information derived from said first and second means, and simultaneously recording on the second channel thereof the pulse information derived from said additional first and second means.

12. A method of recording events as they are observed comprising the steps of producing a reference pulse, producing a pulse at a time interval after said reference pulse which interval is indicative of an observed event, and recording said pulses in the same time relation at substantially the same time said event is observed.

13. The method as set forth in claim 12 in which a series of reference pulses is produced and a series of event pulses is produced, said event pulses being intermediate or alternating with said reference pulses and at time intervals with respect to said reference pulses which time intervals denote various events that have been observed.

14. The method as set forth in claim 13 in which said pulses are electromagnetically recorded.

15. The method as set forth in claim 14 including the step of subsequently feeding said electromagnetically recorded pulses to a computer for processing and storage.

16. The method as set forth in claim 14 including the steps of producing a second series of reference pulses and a second series of event pulses, simultaneously electromagnetically recording on magnetic tape both of said series of reference pulses, and both of said series of event pulses.

17. The method as set forth in claim 16 including the step of simultaneously feeding said two series of recorded reference pulses and said two series of recorded event pulses to a computer for analysis.

18. The method as set forth in claim 13 in which said events pertain to behavioral activity.

19. The method as set forth in claim 18 including the step of actuating a selected key or pushbutton to alter said time intervals between reference pulses and event pulses, the selected key or pushbutton being representative of a particular behavior act.

20. The method as set forth in claim 19 in which the actuation of the selected key or pushbutton is maintained by the observer during the duration of the behavior act so that the successively recorded event pulses possessing substantially the same time interval relationship with the preceding reference pulses will not only indicate the particular behavioral act but will also indicate the duration thereof.

* * * * *

UNITED STATES PATENT OFFICE
CERTIFICATE OF CORRECTION

Patent No. 3,944,796                    Dated March 16, 1976

Inventor(s) Lawrence J. Fitzpatrick

It is certified that error appears in the above-identified patent and that said Letters Patent are hereby corrected as shown below:

Column 1, line 42, "enviroment" should be -- environment --.

Column 5, line 35, "obseved" should be -- observed --; line 47, "rest" should be -- reset --. Column 9, line 11, "$T_1$" second occurrence should be -- $t_1$ --; line 45, "suming" should be -- summing --. Column 10, line 3, "ever' should be -- every--; line 7, "alternatively" should be -- alternately --. Column 11, line 33, "has" should be -- was --. Column 14, line 11, "behavior" should be -- behavioral --; line 15, "behavior" should be -- behavioral --.

Signed and Sealed this eighth Day of June 1976

[SEAL]

Attest:

RUTH C. MASON
Attesting Officer

C. MARSHALL DANN
Commissioner of Patents and Trademarks